United States Patent [19]

Cheung

[11] 4,163,815
[45] Aug. 7, 1979

[54] CATALYZED POLYISOCYANATE COATING COMPOSITIONS

[75] Inventor: Mo-fung Cheung, Warren, Mich.

[73] Assignee: Ford Motor Company, Dearborn, Mich.

[21] Appl. No.: 834,859

[22] Filed: Sep. 19, 1977

[51] Int. Cl.$^2$ .............................................. B05D 3/02
[52] U.S. Cl. .......................... 427/385 R; 260/18 TN; 427/386; 427/388 A; 428/418; 428/423; 528/45; 528/53; 528/76; 528/78
[58] Field of Search ............ 427/385 R, 386, 388 A; 260/2 N, 47 EN, 77.5 AM, 77.5 AQ, 830 P, 77.5 R, 859, 18 TN; 428/418, 423; 528/53, 76, 78, 45

[56] References Cited

U.S. PATENT DOCUMENTS

| | | | |
|---|---|---|---|
| 2,879,178 | 3/1959 | McWherter et al. | 427/385 X |
| 3,304,273 | 2/1967 | Slumberger | 260/2.5 |
| 3,314,901 | 4/1967 | Daumiller et al. | 260/2.5 |
| 3,428,708 | 2/1969 | Kuryla | 260/830 |
| 3,448,065 | 6/1969 | Green | 260/2.5 |
| 3,510,439 | 5/1970 | Kaltenbach et al. | 260/830 X |
| 3,531,468 | 9/1970 | Park et al. | 260/239 |
| 3,565,972 | 2/1971 | Harris | 260/830 P |
| 3,620,984 | 11/1971 | Dahm et al. | 260/2.5 AC |
| 3,660,319 | 5/1972 | Yeakey | 260/2.5 AC |
| 3,792,023 | 2/1974 | Havenith et al. | 528/78 X |
| 3,799,854 | 3/1974 | Jerabek | 204/181 |
| 3,890,255 | 6/1975 | Van Leuwen et al. | 528/78 X |
| 3,922,253 | 11/1975 | Jerabek | 260/77.5 TB |
| 4,007,140 | 2/1977 | Ibbotson | 528/53 X |

OTHER PUBLICATIONS

Shechter et al., *Glycidyl Ether Reactions with Amines*, Industrial and Engineering Chemistry, vol. 48, No. 1, pp. 94–97, Jan. 1956.

*Primary Examiner*—Michael R. Lusignan
*Attorney, Agent, or Firm*—Edmund C. Ross, Jr.; Olin B. Johnson

[57] ABSTRACT

Isocyanate coating compositions prepared from organic polyisocyanates and reaction products made from organic secondary amines and epoxy-terminated compounds provide high solid, convertible coating compositions that cure within conventional curing schedules and have reduced loss of tertiary amine catalyst.

9 Claims, No Drawings

CATALYZED POLYISOCYANATE COATING COMPOSITIONS

BACKGROUND OF THE INVENTION

One type of isocyanate coating is made from isocyanate-terminated adducts or prepolymers cured with a second component as a catalyst. Crosslinking is assumed to occur through the formation of substituted urea groups by reaction of the terminal NCO groups with the moisture in the air as well as through the formation of biuret and allophanate linkages. The latter crosslinks may be formed by the catalyzed reaction of the isocyanate groups with urea and urethane linkage.

Two component isocyanate base coatings include the reaction of isocyanates with hydroxy groups cured with the presence of an organometallic catalyst or the use of isocyanate groups catalyzed by organic amines preferably tertiary amines.

Certain high molecular weight amines have been suggested as catalysts for isocyanates in the presence of polyol in the preparation of urethane foam (e.g., see U.S. Pat. Nos. 3,428,708 and 3,448,065).

THE INVENTION

This invention provides macromolecular tertiary amine reaction products that catalyze isocyanate effectively in forming polymeric film even using conventional curing schedules. Advantageously, as distinguished from conventional amine catalysts, loss of the amine catalyst herein due to volatility during curing need not be anticipated. Further, heat curable coatings formulated with these macromolecular amine reaction products can cure at temperatures in a range between about 80° C. to 100° C. in 15 to 20 minutes with good physical and chemical resistance properties. Still further, good adhesion on metal substrates with conversion coatings is obtained as well as on certain flexible and semi-rigid plastic substrates.

When the pot-life of above mentioned formulations is short (within several hours), a two component system may desirably be employed.

Very high volume solid content with low temperature cure are particular merits of systems herein.

DETAILED DESCRIPTION OF THE INVENTION

Organic polyisocyanates suitable herein include commercially available materials typically used in one and two component isocyanate coating compositions. These materials contain or yield two or more, preferably on the average at least three, isocyanate groups per molecule and are chosen for their film forming capabilities. Thus, the organic polyisocyanates may contain or be derived from aromatic (e.g., tolylene diisocyanates), aliphatic (e.g., hexamethylene di- and especially triisocyanates) and araliphatic (e.g., bisphenylenediisocyanates) isocyanates, including adducts or prepolymers thereof such as products derived from reaction of such polyisocyanates with those obtained from partial glycerides, particularly, for example, partial glycerides obtained from transesterication of castor oil with glycerol. A listing of representative organic polyisocyanates appears at column 10, lines 9–42 of U.S. Pat. No. 3,620,984 which is herein incorporated for such representation. Normally, aliphatic polyisocyanates often have some advantage in providing coatings of greater flexibility as well as good weatherability and are preferred where such properties are desired.

Blocked polyisocyanates may be used to lengthen the pot life of the isocyanate coating compositions herein but do normally require higher curing temperature, e.g., in a range exceeding 150° C. These blocked, semi capped and the like protected polyisocyanates are well known, examples appearing in U.S. Pat. Nos. 3,922,253; 3,984,299 and 3,947,338.

The organic secondary amine is preferably a monoamine and, in one preferred embodiment, aliphatic amine including di-lower alkyl amine desirably containing at least 4 carbon atoms. Another such aliphatic amine is hydroxy aliphatic amine, especially di-lower hydroxyalkyl such as diethanol amine. If reaction rates are sufficient, the organic secondary amine may even be conceivably derived from primary amine as by using an epoxy terminated compound (as hereinafter defined) to achieve tertiary amino functionality in the final reaction product and an equivalent ratio of about 1:2 (i.e., one primary amine group for each epoxy group) should in certain circumstances achieve such a desirable result.

Branching as in diisopropylamine can reduce the rate of tertiary amino formation in reaction with the epoxy compound. Moreover, use of amines (e.g., aromatic amine) with lower bascity than those as above described can also cause reduced reaction rates. In such instances excess of the epoxy terminated compound as well as certain hydroxy solvents (e.g., aliphatic alcohols and monohydroxy benzene) may aid, along with increases in reaction temperature, to provide acceptable reaction rates for tertiary amino formation.

Further considerations in the reaction of amines with epoxy terminated compounds may be found, for example, in "Glycidyl Ether Reactions with Amines" by Shechter et al, *Industrial and Engineering Chemistry,* Vol. 48, No. 1, 1956.

A key in selection of the organic secondary amine reaction component is that it should provide tertiary amino functionality and hydroxy functionality in the reaction product adduct upon reaction with the epoxy terminated compound. Also, minimal, if any, crosslinking is normally desirable, particularly in order to maintain a liquid or liquifiable reaction product during reaction of the organic secondary amine and epoxy terminated compound.

The epoxy terminated compound has at least one terminal epoxy group, and preferably at least one oxy (—O—) interruption within its molecule, for instance, as in those epoxy resins prepared from reacting epichlorohydrin and bisphenol-A (e.g., Epons). Other of these epoxy terminated compounds include those substituted with silicon for carbon up to about 30% by weight as glycidoxy silanes as well as those containing halo substitution such as chloro. In some embodiments, the epoxy terminated compound has hydroxy substitution, besides oxy-interruption within its molecule. Particularly preferred epoxy terminal groups are of the formula

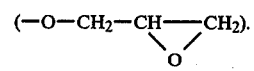

In certain more preferred embodiments the epoxy terminated compound is linear with two terminal epoxy groups, preferably 1,2 epoxy groups, particularly including liquid epichlorohydrin bisphenol-A epoxy resins.

In still another embodiment, the epoxy terminated compound is an acrylic epoxy copolymer having a plurality of epoxy terminal groups prepared, for example, by polymerizing glycidyl acrylate or methacrylate monomers with other such monomers as are typically included in acrylic polymers including acrylates, methacrylates, vinyl hydrocarbons, vinyl esters and halides, as well as other functional monomers e.g., hydroxy methacrylates in the presence of conventional peroxide initiators and suitable non-aqueous medium, e.g., aliphatic alcohols, especially lower alkanols. Desirably, such acrylic epoxy polymers exhibit number average molecular weights such that reaction with the organic secondary amine does not produce too high a viscosity reaction product. Normally then, a number average molecular weight well below 20,000, desirably below about 10,000, but normally above about 3000 is preferred for the acrylic epoxy polymer.

Desirably, glycidyl ether functionality in these epoxy terminated compounds reacts with the secondary amine to provide the adduct containing tertiary amino functionality. As the reaction is normally carried out in liquid phase, suitable solvent and diluents may be used to dissolve and disperse certain viscous higher molecular weight epoxy terminated compounds. Advantageously, reactants (e.g., Epon 828) can be reacted neat thereby eliminating need for solvents and diluents.

Where solvent or diluent or both are desired, hydroxy compounds may serve not only as solvent but also act to some extent to speed the reaction. Lower alkanols as isopropanol are suitable as solvent for reaction of alkyl amines such as di-lower alkyl secondary amines. Other solvents and diluents that aid in contact of the reactants may be selected from those normally available to those in the art including aliphatic, aromatic and araliphatic, particularly including solvents and diluents that contain polarity such as hydroxy functionality.

In this regard, aliphatic alcohols including especially lower alkanols can aid in solubilization of the reaction products particularly in paint formulations wherein the reaction product adduct is made with amino alcohols.

When used, the solvent and/or diluent comprises desirably between about 5–40% by weight of the reaction mixture containing organic amine and epoxy compound, normally about 10–30% by weight. Of course, higher and lower levels may be employed, particularly to achieve a desired viscosity, e.g., Gardner-Holdt viscosity up to Z 2-6, of the reaction product.

Reaction temperatures need only be moderate to obtain desirable reaction in many instances, e.g., up to 100° C., but are often preferably at least about 25° C. Higher and lower temperatures may, of course, be employed to achieve desired reaction rates but the above temperatures provide rates normally sufficient to provide a desired completion within about 30 hours. The course of the reaction may be monitored using conventional techniques.

In one technique the reaction is carried out until an acid aqueous soluble reaction product is attained. In this way the presence of desirable level of tertiary amino functionality may be seen. Other techniques such as measuring epoxy functionality present may also be employed.

The organic secondary amine and epoxy terminated compound are desirably reacted in a range of equivalents so that the secondary amino functionality is converted to tertiary amino functionality, and this is normally achieved by employing one amino equivalent for each epoxy equivalent, although higher levels of epoxy terminated compound, as previously mentioned, may facilitate reaction and can be included in the coating composition. Storage stability of the reaction product is excellent as over six months (e.g., 1 year or more) in many instances and is best achieved through the use of about 1:1 equivalent ratios of secondary amine and epoxy terminated compound. Desirably, excess equivalents of epoxy compounded over the number of secondary amine equivalents are avoided for long storage stability.

The reaction product adduct obtained by reacting the organic secondary amine and epoxy terminated compound are of molecular weights (number average) exceeding about 150, and more desirably as high as 300 or more. Gardner-Holdt viscosities for the reaction product preferably range up to Z-6 or higher with solvents or diluents, if necessary, employed after reaction is completed to provide desired viscosities.

The reaction product adduct obtained from reacting the organic secondary amine and epoxy terminated compound is employed preferably up to 30% by weight of the organic polyisocyanate, and desirably at least about 2.5% by weight of the polyisocyanate. In many formulations, the reaction product adduct need only be employed up to about 10 or 15% by weight of the polyisocyanate to achieve highly desirable results. Of course, mixtures of polyisocyanates as well as mixtures of reaction products described herein may suitably be employed as well as reaction products made from mixed amines and mixed epoxy terminated compounds.

Other ingredients that can make up the preferred nonaqueous coating compositions herein, besides conventional pigments, fillers, diluents, solvents, etc., include compounds with reactive hydrogens as are known in the art, and, as in certain embodiments, the epoxy terminated compounds as previously described.

As previously mentioned, the isocyanate coating compositions are suitable for coating on a variety of substrates. Of particular advantage are non-chromate coatings for indoor metal substrates that are conversion coated. Such coatings exhibit advantageous properties including adhesion as well as physical and chemical resistance. Moreover, chromate coatings as primers also exhibit good weatherability particularly as automotive primers and are preferably applied to a thickness in a range of 1±0.1 mil. Other coatings are normally applied at a range of 1±0.5 mil. but other thickness ranges may also be advantageous.

Spray coating can utilize two component systems that advantageously cure in a range of up to 100° C. or below. Moreover, other application techniques as coil coating may be advantageously employed.

The following examples illustrate preferred aspects of this invention and, accordingly, are not intended as limiting its broader scope.

EXAMPLE 1

A heat curable two-component coatings system is prepared as outlined in the following steps.

STEP I

Preparation of macromolecular amines: The following ingredients are used to prepare the amine adduct.

| Materials | Parts by Weights |
|---|---|
| Epon 828[(1)] | 58.8 |

| Materials | Parts by Weights |
|---|---|
| Diethylamine | 22.6 |
| Isopropanol | 18.6 |

[1] Epon 828, a product of Shell Chemical Co., is an Epichlorohydrin-bisphenol A type epoxy resin.

The above materials are mixed in a suitable equipped reaction vessel and heated to 50°±5° C. The reaction is generally carried out at a 16 hour period or until a completely water soluble solution is obtained when the adduct is neutralized with acid. The adduct so obtained has a Gardner-Holdt viscosity between Z1 and Z2.

STEP II

Preparation of paint: A primer paint used for metal substrate is prepared using the amine adduct from Step I. The following ingredients are used to prepare a mill base:

| Materials | Parts by Weight |
|---|---|
| Amine adduct from Step I | 3.9 |
| Silica | 3.0 |
| Red Iron Oxide | 6.1 |
| Titanium Dioxide | 6.1 |
| Zinc Chromate | 6.1 |
| Barium Sulfate | 39.6 |
| Toluene | 12.3 |

The above mixtures are ground in a conventional dispersing mill to a Hegman reading of 6 to 7. Final formulation is accomplished by adding 22.9 part of polyisocyanate (experimental product VPKL5-2291[2]). The final mixing and filtering are generally carried out immediately prior to spray. (An alternative way of processing would be carried out by a conventional two-component spraying equipment). The paint so obtained has a final viscosity of 35 seconds on a No. 4 Ford Cup. Total solid is 87% by weight and 70% by volume (by calculation).

(2) VPKL5-2291 is a aliphatic triisocyanate from Mobay Chemical Corporation.

The paint is sprayed on conventional steel substrate with phosphated conversion coatings and cured at 85° C. for 15 minutes. Excellent resistance properties are obtained. The coatings also exhibits good gloss and flexibility. No loss of adhesion along the scribe line on condensing humidity (50°±1° C. water temperature) and standard salt spray in 240 hours period. Excellent gravelometer impact resistance is obtained with conventional automotive enamels on it.

EXAMPLE 2

The procedures of Example 1 steps I and II are repeated with the sole difference that the polyisocyanate VPKL5-2291 is replaced by VPKL5-2333[1]. Essentially the same resistance properties and testing results are obtained with lower paint viscosity (approximately 28 seconds No. 4 Ford Cup).

(1) VPKL5-2333, a polyisocyanate product of Mobay Chemical Corporation.

EXAMPLE 3

The procedures of Example 1 steps I and II are repeated with the following differences in the composition of mill base:

| Materials | Parts by Weight |
|---|---|
| Silica | 3.0 |
| Red Iron Oxide | 6.1 |
| Titanium Dioxide | 6.1 |
| Zinc Chromate | 6.1 |
| Barium Sulfate | 39.6 |
| Amine Adduct from Step I Example I | 3.3 |
| Toluene | 12.3 |

The above mill base is let down with 23.5 parts of VPKL5-2291 (defined in Example 1). Essentially similar end properties are obtained when the paint is cured 15 minutes at 100° C.

EXAMPLE 4

The procedure of Example 1 steps I and II are repeated with the following differences in the composition of the mill base:

| Materials | Parts by Weight |
|---|---|
| Amine Adduct from Step I, Example I | 1.6 |
| Silica | 3.0 |
| Red Iron Oxide | 6.1 |
| Titanium Dioxide | 6.1 |
| Zinc Chromate | 6.1 |
| Barium Sulfate | 39.6 |
| Toluene | 12.7 |

The above mill base is let down by 24.8 parts of VPKL5-2291 (Defined in Example 1). Paint is cured 20 minutes at 125° C. Essentially similar results are obtained as outlined in Example 1.

EXAMPLE 5

The procedures of Example 1, step I are repeated with the differences that are set forth:

| Materials | Parts by Weight |
|---|---|
| DER 332[1] | 56.7 |
| Diethylamine | 23.8 |
| Isopropylalcohol | 19.5 |

[1] DER 332, an epoxy-terminated product of Dow Chemical Co.

EXAMPLE 6

The procedures of Example 1, step II are again followed with the following differences in the ratio of isocyanates to amine adducts. The amine adduct used is from Example 5.

| | Isocyanates/Amine Adducts | Curing Schedules |
|---|---|---|
| A. | 80/20 | 80° C.; 15 minutes |
| B. | 90/10 | 100° C.; 15 minutes |
| C. | 95/5 | 125° C.; 20 minutes |

EXAMPLE 7

The procedures of Example 1 are again followed except in the second step, epoxy resin such as Epon 828, DER 332, or 1,4 butanediol diglycidylether is included. Thus Example 1 step II is reformulated as hereinafter set forth:

| Materials | Parts by Weight |
| --- | --- |
| Epon 828[(1)] | 2.6 |
| Amine Adduct from Step I, Example 1 | 3.9 |
| Silica | 3.0 |
| Red Iron Oxide | 6.1 |
| Titanium Dioxide | 6.1 |
| Zinc Chromate | 6.1 |
| Barium Sulfate | 39.6 |
| Toluene | 12.3 |

[(1)]Defined in Example 1.

This mill base is let down by 20.3 parts of VPKL5-2291 (defined in Example 1). Tougher film properties are obtained with the above mentioned curing schedules. Resistance properties are also improved.

EXAMPLE 8

The procedures of Example 1, step I are again followed with the sole difference that isopropanol is deleted. The amine adduct so obtained has same effect on catalyzing the isocyanates except that the end viscosity of the amine adduct is much higher.

EXAMPLE 9

The procedures of Example 5 are followed except that isopropanol is deleted. Essentially similar results are obtained as in Example 8.

EXAMPLE 10

The ingredients of Example 1, step I are mixed together in a well equipped vessel. The reaction is then carried out at ambient room temperature and atmospheric pressure. The reaction is continued for 64 hours or until a completely water soluble material is obtained upon neutralization with acid.

EXAMPLE 11

The procedures of Example 1, step I are again followed with the following differences:

| Materials | Parts by Weight |
| --- | --- |
| Gamma-glycidoxy-propyltrimethoxysilane[(1)] | 64 |
| Diethylamine | 19.8 |
| Isopropyl alcohol | 16.2 |

[(1)]Gamma-glycidoxy-propyltrimethoxysilane is a product of Union Carbide Corp. Product designation as A187.

The reaction is carried out at 50°±5° C. for 16 hours or until a completely water soluble material is obtained when neutralized with acid. Gardner-Holdt viscosity of less than A is obtained.

The following ingredients are dispensed to form a mill base, again, the procedures of Example 1, step II are followed:

| Materials | Parts by Weight |
| --- | --- |
| Amine Adduct from Step I, Example 11 | 11.3 |
| Toluene | 8.2 |
| Silica | 3.2 |
| Red Iron Oxide | 6.3 |
| Titanium Dioxide | 6.3 |
| Zinc Chromate | 6.3 |
| Barium Sulfate | 40.9 |

When the above mill base is let down by 17.5 parts of VPKL5-2333, (Defined in Example 2), and cured 20 minutes at 125° C., good physical and resistance properties are obtained.

EXAMPLE 12

The procedures of Example 11, step I are followed with the sole exception that isopropyl alcohol is deleted as a solvent for reaction. A Gardner-Holdt viscosity of H is obtained.

EXAMPLE 13

The procedures of Example 12 is repeated except that 1,4 butanediol diglycidylether is used. Gardner-Holdt viscosity of A is obtained.

A mill base is prepared by using the following ingredients:

| Materials | Parts by Weight |
| --- | --- |
| Amine Adduct from above | 5.4 |
| Silica | 3.2 |
| Red Iron Oxide | 6.3 |
| Titanium Dioxide | 6.3 |
| Zinc Chromate | 6.3 |
| Barium Sulfate | 40.9 |
| Toluene | 10.0 |

This mill base is then let down by 21.6 parts of VPKL5-2291 (as defined in Example 1). Good physical and resistance properties are obtained by baking 100° C. for 20 minutes.

EXAMPLE 14

A heat curable coating is prepared by the steps hereinafter set forth:

STEP I

A well equipped vessel is charged with the following ingredients:

| Materials | Parts by Weight |
| --- | --- |
| Epon 828[(1)] | 53.5 |
| Diethanolamine | 29.6 |
| Isopropanol | 16.9 |

[(1)]Defined in Example 1.

The above mixture is stirred at ambient room temperature. An exotherm is observed; and the reaction usually is completed within 30 minutes.

STEP II

Preparation of Mill Base:

| Materials | Parts by Weight |
| --- | --- |
| Amine Adduct from Step I | 8.7 |
| Silica | 2.8 |
| Red Iron Oxide | 5.6 |
| Titanium Dioxide | 5.6 |
| Zinc Chromate | 5.6 |
| Barium Sulfate | 36.4 |
| Toluene | 8.5 |
| Isopropanol | 10.0 |

These materials are mixed together and dispersed in a standard dispersing equipment and is further let down by 16.8 parts of VPKL5-2291 (defined in Example 1). Primer coats on phosphated cold rolled steel and cure at 120° C. for 20 minutes exhibits good physical and resistance properties.

EXAMPLE 15

A heat curable coating is obtained by following the procedures of Example 1 with the sole difference as the isocyanates is Desmodur N-100[(1)] instead of VPKL5-2291 (as defined in Example 1). Similar physical and resistance properties are obtained by curing 15 minutes at 85° C.

(1) Desmodur N-100 is a polyisocyanate product from Mobay Chemical Corporation.

EXAMPLE 16

A heat curable coating is obtained by following the procedures of Example 5 with the sole difference that VPKL5-2291 is replaced by Desmodur N-100. Similar physical and resistance properties are obtained by curing at 85° C. for 15 minutes.

EXAMPLE 17

A heat curable coating is formulated by using the following ingredients:

| Materials | Parts by Weight |
| --- | --- |
| Amine Adduct from Example 1 Step I | 5.3 |
| Titanium Dioxide | 28.0 |
| Toluene | 28.9 |

The above materials are dispersed in a standard grinding equipment to a Hegman reading of at least 7; and is let down by 37.8 parts of VPKL5-2291 (defined in Example 1). The finished paint has a Ford No. 4 Cup viscosity of 15 sec. Gloss reading is 82 at 20 degree when spray on conventional automotive epoxy primer and cured 17 minutes at 90° C. Excellent physical and chemical resistance properties are obtained. The gravelometer impact resistance is exceptionally good.

EXAMPLE 18

The procedures of Example 17 is repeated with the only difference that VPKL5-2291 is replaced by Desmodur-N-100. Essentially similar results are obtained.

EXAMPLE 19

A heat curable coating is prepared by the steps hereinafter set forth:

STEP I

A conventional well-equipped vessel, which includes stirrer, thermometer, dropping funnel and inert gas inlet is used to prepare an acrylic solution polymer. To the reaction vessel is charged 26.7 parts of isopropanol. The isopropanol is brought to refluxing temperature under nitrogen atmosphere. The following mixture of monomers and initiator is then added to the reaction vessel dropwise.

| Materials | Parts by Weight |
| --- | --- |
| Butylmethacrylate | 49.8 |
| Glycidylmethacrylate | 12.5 |
| t-butylperoctoate | 4.5 |

Total addition time is 80 minutes. The polymerization reaction is continued and held at refluxing temperature (85°±2° C.), and under nitrogen atmosphere. A 0.1 part of t-butylperoctoate is added after 30 minutes. The reaction is continued for another 90 minutes. A molecular weight ($\overline{Mn}$) of approximately 7700 is obtained. The reaction mixture is then cooled to about 50° C. 6.5 parts of diethylamine is added to the solution polymer. The reaction is continued for 24 hours with stirring at 50°±2° C. The viscosity of the reaction mixture becomes very high at the later stage of the reaction and stirring, therefore, becomes impractical. A dark-amber viscous material is obtained. This material is soluble in acid aqueous solution.

STEP II

Formulation of paint:

A mill base is prepared with the following ingredients:

| Materials | Parts by Weight |
| --- | --- |
| Titanium Dioxide | 28.0 |
| Amine Adduct from Example 1, Step 1 | 5.3 |
| Solution Polymer from Step 1 | 3.0 |
| Toluene | 28.0 |

The above materials are dispersed in a standard grinding equipment to a Hegman reading of at least 7; and is let down by 35.7 parts of VPKL5-2291 (defined in Example 1). The finished paint when spray on conventional automotive epoxy primer and cured 17 minutes at 90° C. displays a gloss reading of 85 at 20 degree. Excellent physical and chemical resistance properties are obtained. The gravelometer impact resistance is exceptionally good. The addition of the acrylic solution polymer essentially eliminates craters (surface defects) which is found in Example 17. Weathering resistance (as exposed to weatherometer) is also improved.

What is claimed is:

1. A method for making high solid isocyanate coating compositions and curing them into continuous polymeric coatings, which comprises:
   (I) admixing in film forming amount in the coating composition: (A) a major amount by weight organic polyisocyanate and (B) a minor amount by weight of reaction product made by reacting (1) organic secondary amine comprising monoamine and (2) epoxy terminated compound wherein the equivalent ratio of (1) to (2) is about 1:1 and the reaction product adduct has:
      (i) hydroxy functionality;
      (ii) tertiary amino functionality; and
      (iii) a number average molecular weight in excess of about 150, wherein (B) is at least about 2.5% by weight of (A);
   (II) applying the coating composition of (I) that comprises (A) and (B) to a substrate; and
   (III) exposing the coating composition that is applied to the substrate to elevated temperature to yield the continuous polymer coating.

2. The method in accordance with claim 1, wherein (B) comprises up to about 30 percent by weight of (A).

3. The method in accordance with claim 1, wherein (B)(2) comprises a condensation product of epichlorohydrin and bisphenol-A.

4. The method in accordance with claim 3, wherein (B)(1) comprises an aliphatic monoamine.

5. The method in accordance with claim 1, wherein up to 30% by weight of (B)(2) comprises silicon.

6. The method in accordance with claim 5, which comprises admixing with (A) and (B) with (B)(2).

7. The method in accordance with claim 1, wherein (B) is made in the presence of lower alkanol.

8. The method in accordance with claim 1, wherein (B) is soluble in aqueous acid solution.

9. The method in accordance with claim 1, wherein the organic polyisocyanate (A) comprises an aliphatic tri-isocyanate.

* * * * *